(12) United States Patent
Wang

(10) Patent No.: US 11,537,810 B2
(45) Date of Patent: Dec. 27, 2022

(54) METHOD FOR ADJUSTING RESOURCE OF INTELLIGENT ANALYSIS DEVICE AND APPARATUS

(71) Applicant: HUAWEI TECHNOLOGIES CO., LTD., Shenzhen (CN)

(72) Inventor: Zhenyu Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/206,609

(22) Filed: Mar. 19, 2021

(65) Prior Publication Data

US 2021/0209411 A1  Jul. 8, 2021

Related U.S. Application Data

(63) Continuation of application No. PCT/CN2019/090274, filed on Jun. 6, 2019.

(30) Foreign Application Priority Data

Sep. 21, 2018  (CN) .......................... 201811110372.4

(51) Int. Cl.
*G06K 9/62* (2022.01)
*H04N 5/232* (2006.01)
(Continued)

(52) U.S. Cl.
CPC .......... *G06K 9/6227* (2013.01); *G06V 20/52* (2022.01); *H04N 5/23203* (2013.01); *H04N 5/247* (2013.01); *H04N 7/181* (2013.01)

(58) Field of Classification Search
None
See application file for complete search history.

(56) References Cited

U.S. PATENT DOCUMENTS

| 2006/0171453 | A1  | 8/2006 | Rohlfing et al. |
| 2007/0177023 | A1* | 8/2007 | Beuhler ............... G08B 29/188 |
| | | | 348/211.3 |

(Continued)

FOREIGN PATENT DOCUMENTS

| CN | 101808126 A | 8/2010 |
| CN | 102547250 A | 7/2012 |

(Continued)

*Primary Examiner* — James M Anderson, II
(74) *Attorney, Agent, or Firm* — Rimon PC

(57) ABSTRACT

This application provides a method for adjusting a resource of an intelligent analysis device and an apparatus. The method includes: obtaining status information of an intelligent analysis device that accesses a surveillance platform and application information deployed on the intelligent analysis device, where the status information includes resource usage and a quantity of bound cameras; after a camera accesses the surveillance platform, selecting a to-be-bound intelligent analysis device for the camera based on the status information and the application information of the intelligent analysis device that accesses the surveillance platform; and sending, to the selected intelligent analysis device, a command for binding the camera. In this way, the resource of the intelligent analysis device may be automatically allocated. This improves processing efficiency and avoids low efficiency caused by manual processing.

20 Claims, 8 Drawing Sheets

(51) Int. Cl.
   *H04N 5/247*    (2006.01)
   *H04N 7/18*     (2006.01)
   *G06V 20/52*    (2022.01)

(56) References Cited

U.S. PATENT DOCUMENTS

| | | |
|---|---|---|
| 2009/0031381 A1 | 1/2009 | Cohen et al. |
| 2014/0289415 A1 | 9/2014 | Chan et al. |
| 2017/0078626 A1 | 3/2017 | Chowdhery et al. |
| 2017/0099463 A1 | 4/2017 | Trani |
| 2018/0063406 A1 | 3/2018 | Yang et al. |

FOREIGN PATENT DOCUMENTS

| | | | |
|---|---|---|---|
| CN | 104363300 A | 2/2015 | |
| CN | 104581423 A | 4/2015 | |
| CN | 104618693 A | 5/2015 | |
| CN | 104917836 A | 9/2015 | |
| CN | 106455115 A | 2/2017 | |
| CN | 108122246 A | 6/2018 | |
| WO | 2017130244 A2 | 8/2017 | |
| WO | 2017166119 A1 | 10/2017 | |
| WO | WO-2017166119 A1 * | 10/2017 | ............. H04L 43/16 |
| WO | 2018161884 A1 | 9/2018 | |

\* cited by examiner

METHOD FOR ADJUSTING RESOURCE OF INTELLIGENT ANALYSIS DEVICE AND APPARATUS

CROSS-REFERENCE TO RELATED APPLICATIONS

This application is a continuation of International Application No. PCT/CN2019/090274, filed on Jun. 6, 2019, which claims priority to Chinese Patent Application No. 201811110372.4, filed on Sep. 21, 2018. The disclosures of the aforementioned applications are hereby incorporated by reference in their entireties.

TECHNICAL FIELD

This application relates to the video surveillance field, and in particular, to a method for adjusting a resource of an intelligent analysis device and an apparatus.

BACKGROUND

A smart camera is a surveillance camera with an independent intelligent processing function (for example, facial recognition and license plate number recognition). With the booming of smart cameras, a problem that a video heavily depends on manual check is resolved, and the timeliness of intelligent recognition and response are effectively ensured. Therefore, smart cameras are widely applied to various fields such as public security, transportation, and industrial production.

SUMMARY

This application provides a method for adjusting a resource of an intelligent analysis device and an apparatus, to dynamically schedule the resource of the intelligent analysis device, and improve processing efficiency.

According to a first aspect, this application provides a method for adjusting a resource of an intelligent analysis device, including:

obtaining status information of an intelligent analysis device that accesses a surveillance platform and application information deployed on the intelligent analysis device, where the status information includes resource usage and a quantity of bound cameras; after a camera accesses the surveillance platform, selecting a to-be-bound intelligent analysis device for the camera based on the status information and the application information of the intelligent analysis device that accesses the surveillance platform; and sending, to the selected intelligent analysis device, a command for binding the camera.

According to the method for adjusting a resource of an intelligent analysis device provided in the first aspect, the status information of the intelligent analysis device that accesses the surveillance platform and the application information deployed on the intelligent analysis device are obtained through the surveillance platform. After any camera accesses the surveillance platform, the surveillance platform selects the to-be-bound intelligent analysis device for the camera based on the status information and the application information of the intelligent analysis device that accesses the surveillance platform. The surveillance platform sends, to the selected intelligent analysis device, the command for binding the camera, so that the camera is bound to the intelligent analysis device. In this way, the surveillance platform may dynamically bind a camera with only an image collection function to an appropriate intelligent analysis device based on a resource of the intelligent analysis device that accesses the surveillance platform. The intelligent analysis device may analyze and process a video stream collected by the camera. In this way, the resource of the intelligent analysis device may be automatically allocated. This improves processing efficiency and avoids low efficiency caused by manual processing.

In a possible design, the selecting a to-be-bound intelligent analysis device for the camera based on the status information and the application information of the intelligent analysis device that accesses the surveillance platform includes:

selecting, through polling from intelligent analysis devices whose resource usages are less than a resource usage threshold and whose application information matches the camera, an intelligent analysis device to be bound to the camera; or selecting, from intelligent analysis device whose resource usages are less than a resource usage threshold and whose application information matches the camera, an intelligent analysis device closest to the camera to be bound to the camera; or selecting, from intelligent analysis devices whose resource usages are less than a resource usage threshold and whose application information matches the camera, an intelligent analysis device with lowest resource usage to be bound to the camera.

In a possible design, the method further includes:

sending a status information obtaining request to the intelligent analysis device that accesses the surveillance platform; and receiving the status information sent by the intelligent analysis device that accesses the surveillance platform.

In a possible design, the method further includes:

when the resource usage of the intelligent analysis device that accesses the surveillance platform is greater than the resource usage threshold, performing load balancing processing on the intelligent analysis device.

In a possible design, the performing load balancing processing on the intelligent analysis device includes:

if the intelligent analysis device is bound to the camera, reselecting a to-be-bound intelligent analysis device for one or more cameras bound to the intelligent analysis device;

sending, to the intelligent analysis device, a command for unbinding the one or more cameras from the intelligent analysis device; and sending, to the reselected to-be-bound intelligent analysis device, a command for binding the one or more cameras.

According to the method for adjusting a resource of an intelligent analysis device provided in this implementation, the surveillance platform may dynamically bind the camera with only the image collection function to the appropriate intelligent analysis device based on the resource of the intelligent analysis device that accesses the surveillance platform. In a working process of the intelligent analysis device, if the surveillance platform finds an intelligent analysis device whose resource usage is greater than the resource usage threshold, the surveillance platform performs load balancing processing on the intelligent analysis device. A binding relationship between the camera and the intelligent analysis device may be dynamically adjusted, to resolve a problem of unbalanced utilization of the resource of the intelligent analysis device. This balances the resource of the intelligent analysis device in an entire system, improves the processing efficiency, and avoids the low efficiency caused by the manual processing.

In a possible design, the performing load balancing processing on the intelligent analysis device includes:

if the intelligent analysis device is not bound to the camera, selecting a to-be-bound target intelligent analysis device for the intelligent analysis device based on status information and application information of another intelligent analysis device that accesses the surveillance platform;

sending, to the target intelligent analysis device, a command for binding the intelligent analysis device; and sending, to the intelligent analysis device, a command for stopping processing some service applications.

According to the method for adjusting a resource of an intelligent analysis device provided in this implementation, the surveillance platform may dynamically bind the camera with only the image collection function to the appropriate intelligent analysis device based on the resource of the intelligent analysis device that accesses the surveillance platform. In the working process of the intelligent analysis device, if the surveillance platform finds an intelligent analysis device whose resource usage is greater than the resource usage threshold, the surveillance platform performs load balancing processing on the intelligent analysis device. Video streams of some service applications on the intelligent analysis device may be transferred to an intelligent analysis device bound to the intelligent analysis device for processing, to implement offloading. This resolves the problem of unbalanced utilization of the resource of the intelligent analysis device, balances the resource of the intelligent analysis device in the entire system, improves the processing efficiency, and avoids the low efficiency caused by the manual processing.

According to a second aspect, this application provides a method for adjusting a resource of an intelligent analysis device, including:

after an intelligent analysis device accesses a surveillance platform, sending, to the surveillance platform, status information of the intelligent analysis device and application information deployed on the intelligent analysis device, where the status information includes resource usage and a quantity of bound cameras;

receiving, by the intelligent analysis device, a command sent by the surveillance platform for binding a target camera, and sending a video stream request to the target camera; and receiving, by the intelligent analysis device, a video stream sent by the target camera, and analyzing and processing the received video stream.

According to the method for adjusting a resource of an intelligent analysis device provided in the second aspect, after the intelligent analysis device accesses the surveillance platform, the status information of the intelligent analysis device and the application information deployed on the intelligent analysis device are sent to the surveillance platform. After any camera accesses the surveillance platform, the surveillance platform selects a to-be-bound intelligent analysis device for the camera based on the status information and the application information of the intelligent analysis device that accesses the surveillance platform. The surveillance platform sends, to the selected intelligent analysis device, a command for binding the camera, so that the camera is bound to the intelligent analysis device. The intelligent analysis device receives the video stream sent by the target camera, and analyzes and processes the received video stream. In this way, the surveillance platform may dynamically bind a camera with only an image collection function to an appropriate intelligent analysis device based on a resource of the intelligent analysis device that accesses the surveillance platform. The intelligent analysis device may analyze and process a video stream collected by the camera. In this way, the resource of the intelligent analysis device may be automatically allocated. This improves processing efficiency and avoids low efficiency caused by manual processing.

In a possible design, the method further includes:

receiving, by the intelligent analysis device, a status information obtaining request sent by the surveillance platform; and sending, by the intelligent analysis device, the status information of the intelligent analysis device to the surveillance platform.

In a possible design, when the resource usage of the intelligent analysis device is greater than a resource usage threshold, the method further includes:

receiving, by the intelligent analysis device, a command sent by the surveillance platform for unbinding one or more cameras from the intelligent analysis device; and sending, by the intelligent analysis device to the one or more unbound cameras, a command for stopping sending a video stream.

According to the method for adjusting a resource of an intelligent analysis device provided in this implementation, in a working process of the intelligent analysis device, if the surveillance platform finds an intelligent analysis device whose resource usage is greater than the resource usage threshold, the surveillance platform performs load balancing processing on the intelligent analysis device. A binding relationship between the camera and the intelligent analysis device may be dynamically adjusted, to resolve a problem of unbalanced utilization of the resource of the intelligent analysis device. This balances the resource of the intelligent analysis device in an entire system, improves the processing efficiency, and avoids the low efficiency caused by the manual processing.

In a possible design, when the resource usage of the intelligent analysis device is greater than a resource usage threshold, the method further includes:

receiving, by the intelligent analysis device, a video stream request sent by a target intelligent analysis device bound to the intelligent analysis device, where the target intelligent analysis device is selected by the surveillance platform for the intelligent analysis device based on status information and application information of another intelligent analysis device that accesses the surveillance platform;

receiving, by the intelligent analysis device, a command sent by the surveillance platform for stopping processing some service applications; and sending, by the intelligent analysis device, video streams of some service applications to the target intelligent analysis device.

According to the method for adjusting a resource of an intelligent analysis device provided in this implementation, in the working process of the intelligent analysis device, if the surveillance platform finds an intelligent analysis device whose resource usage is greater than the resource usage threshold, the surveillance platform selects the to-be-bound target intelligent analysis device for the intelligent analysis device based on the status information and the application information of the another intelligent analysis device that accesses the surveillance platform. The video streams of some service applications on the intelligent analysis device may be transferred to the target intelligent analysis device for processing, to implement offloading. This resolves the problem of unbalanced utilization of the resource of the intelligent analysis device, balances the resource of the intelligent analysis device in the entire system, improves the processing efficiency, and avoids the low efficiency caused by the manual processing.

According to a third aspect, this application provides a surveillance platform, including:

an obtaining module, configured to obtain status information of an intelligent analysis device that accesses a surveillance platform and application information deployed on the intelligent analysis device, where the status information includes resource usage and a quantity of bound cameras; a selection module, configured to: after a camera accesses the surveillance platform, select a to-be-bound intelligent analysis device for the camera based on the status information and the application information of the intelligent analysis device that accesses the surveillance platform; and a sending module, configured to send, to the selected intelligent analysis device, a command for binding the camera.

In a possible design, the selection module is configured to:

select, through polling from intelligent analysis devices whose resource usages are less than a resource usage threshold and whose application information matches the camera, an intelligent analysis device to be bound to the camera; or select, from intelligent analysis devices whose resource usages are less than a resource usage threshold and whose application information matches the camera, an intelligent analysis device closest to the camera to be bound to the camera; or select, from intelligent analysis devices whose resource usages are less than a resource usage threshold and whose application information matches the camera, an intelligent analysis device with lowest resource usage to be bound to the camera.

In a possible design, the obtaining module is configured to:

send a status information obtaining request to the intelligent analysis device that accesses the surveillance platform; and receive the status information sent by the intelligent analysis device that accesses the surveillance platform.

In a possible design, the surveillance platform further includes:

a processing module, configured to: when the resource usage of the intelligent analysis device that accesses the surveillance platform is greater than the resource usage threshold, perform load balancing processing on the intelligent analysis device.

In a possible design, the processing module is configured to:

if the intelligent analysis device is bound to the camera, reselect a to-be-bound intelligent analysis device for one or more cameras bound to the intelligent analysis device.

The sending module is further configured to send, to the intelligent analysis device, a command for unbinding the one or more cameras from the intelligent analysis device.

The sending module is further configured to send, to the reselected to-be-bound intelligent analysis device, a command for binding the one or more cameras.

In a possible design, the processing module is configured to:

if the intelligent analysis device is not bound to the camera, select a to-be-bound target intelligent analysis device for the intelligent analysis device based on status information and application information of another intelligent analysis device that accesses the surveillance platform;

send, to the target intelligent analysis device, a command for binding the intelligent analysis device; and send, to the intelligent analysis device, a command for stopping processing some service applications.

For beneficial effects of the apparatus provided in the third aspect and the possible designs of the third aspect, refer to the beneficial effects brought by the first aspect and the possible implementations of the first aspect. Details are not described herein again.

According to a fourth aspect, this application provides an intelligent analysis device, including: a sending module, configured to: after the intelligent analysis device accesses a surveillance platform, send, to the surveillance platform, status information of the intelligent analysis device and application information deployed on the intelligent analysis device, where the status information includes resource usage and a quantity of bound cameras; a receiving module, configured to receive a command sent by the surveillance platform for binding a target camera, where the sending module is further configured to send a video stream request to the target camera, and the receiving module is further configured to receive a video stream sent by the target camera; and a processing module, configured to analyze and process the received video stream.

In a possible design, the receiving module is further configured to receive a status information obtaining request sent by the surveillance platform; and the sending module is further configured to send the status information of the intelligent analysis device to the surveillance platform.

In a possible design, when the resource usage of the intelligent analysis device is greater than a resource usage threshold, the receiving module is further configured to:

receive a command sent by the surveillance platform for unbinding one or more cameras from the intelligent analysis device; and the sending module is further configured to send, to the one or more unbound cameras, a command for stopping sending a video stream.

In a possible design, when the resource usage of the intelligent analysis device is greater than a resource usage threshold, the receiving module is further configured to:

receive a video stream request sent by a target intelligent analysis device bound to the intelligent analysis device, where the target intelligent analysis device is selected by the surveillance platform for the intelligent analysis device based on status information and application information of another intelligent analysis device that accesses the surveillance platform; and receive a command sent by the surveillance platform for stopping processing some service applications; and the sending module is further configured to send video streams of some service applications to the target intelligent analysis device.

For beneficial effects of the apparatus provided in the fourth aspect and the possible designs of the fourth aspect, refer to the beneficial effects brought by the second aspect and the possible implementations of the second aspect. Details are not described herein again.

According to a fifth aspect, this application provides a surveillance platform, including a memory and a processor.

The memory is configured to store a program instructions.

The processor is configured to invoke the program instructions in the memory to perform the method for adjusting a resource of an intelligent analysis device in the first aspect or any possible design of the first aspect.

According to a sixth aspect, this application provides an intelligent analysis device, including a memory and a processor.

The memory is configured to store a program instruction.

The processor is configured to invoke the program instruction in the memory to perform the method for adjusting a resource of an intelligent analysis device in the second aspect or any possible design of the second aspect.

According to a seventh aspect, this application provides a readable storage medium. The readable storage medium stores an executable instruction. When at least one processor of a surveillance platform executes the executable instruction, the surveillance platform performs the method for adjusting a resource of an intelligent analysis device in the first aspect or any possible design of the first aspect.

According to an eighth aspect, this application provides a readable storage medium. The readable storage medium stores an executable instruction. When at least one processor of an intelligent analysis device executes the executable instruction, the intelligent analysis device performs the method for adjusting a resource of an intelligent analysis device in the second aspect or any possible design of the second aspect.

According to a ninth aspect, this application provides a program product. The program product includes an executable instruction, and the executable instruction is stored in a readable storage medium. At least one processor of a surveillance platform may read the executable instruction from the readable storage medium. The at least one processor executes the executable instruction, so that the surveillance platform is enabled to implement the method for adjusting a resource of an intelligent analysis device in the first aspect or any possible design of the first aspect.

According to a tenth aspect, this application provides a program product. The program product includes an executable instruction, and the executable instruction is stored in a readable storage medium. At least one processor of an intelligent analysis device may read the executable instructions from the readable storage medium. The at least one processor executes the executable instruction, so that the intelligent analysis device is enabled to implement the method for adjusting a resource of an intelligent analysis device in the second aspect or any possible design of the second aspect.

According to an eleventh aspect, this application provides a chip. The chip is connected to a memory, or the memory is integrated into the chip. A software program stored in the memory is executed to implement the method for adjusting a resource of an intelligent analysis device in the first aspect or any possible design of the first aspect or in the second aspect or any possible design of the second aspect.

According to a twelfth aspect, this application provides a method for adjusting a resource of an intelligent analysis device, including:

after an intelligent analysis device accesses a surveillance platform, sending, to the surveillance platform, status information of the intelligent analysis device and application information deployed on the intelligent analysis device, where the status information includes resource usage and a quantity of bound cameras;

after a camera accesses the surveillance platform, selecting, by the surveillance platform, a to-be-bound intelligent analysis device for the camera based on the status information and the application information of the intelligent analysis device that accesses the surveillance platform;

sending, by the surveillance platform to the selected intelligent analysis device, a command for binding the camera; and sending, by the intelligent analysis device that receives the command for binding the camera, a video stream request to the camera, receiving a video stream sent by the camera, and analyzing and processing the received video stream.

According to the method for adjusting a resource of an intelligent analysis device provided in the twelfth aspect, after the intelligent analysis device accesses the surveillance platform, the intelligent analysis device sends the status information of the intelligent analysis device and the application information deployed on the intelligent analysis device. After any camera accesses the surveillance platform, the surveillance platform selects the to-be-bound intelligent analysis device for the camera based on the status information and the application information of the intelligent analysis device that accesses the surveillance platform. The surveillance platform sends, to the selected intelligent analysis device, the command for binding the camera, so that the camera is bound to the intelligent analysis device. In this way, the surveillance platform may dynamically bind a camera with only an image collection function to an appropriate intelligent analysis device based on a resource of the intelligent analysis device that accesses the surveillance platform. The intelligent analysis device may analyze and process a video stream collected by the camera. In this way, the resource of the intelligent analysis device may be automatically allocated. This improves processing efficiency and avoids low efficiency caused by manual processing.

In a possible design, the selecting a to-be-bound intelligent analysis device for the camera based on the status information and the application information of the intelligent analysis device that accesses the surveillance platform includes:

selecting, through polling from intelligent analysis devices whose resource usages are less than a resource usage threshold and whose application information matches the camera, an intelligent analysis device to be bound to the camera; or selecting, from intelligent analysis devices whose resource usages are less than a resource usage threshold and whose application information matches the camera, an intelligent analysis device closest to the camera to be bound to the camera; or selecting, from intelligent analysis devices whose resource usages are less than a resource usage threshold and whose application information matches the camera, an intelligent analysis device with lowest resource usage to be bound to the camera.

In a possible design, the method further includes:

sending, by the surveillance platform, a status information obtaining request to the intelligent analysis device; and sending, by the intelligent analysis device, the status information of the intelligent analysis device to the surveillance platform.

In a possible design, the method further includes:

when the resource usage of the intelligent analysis device that accesses the surveillance platform is greater than the resource usage threshold, performing, by the surveillance platform, load balancing processing on the intelligent analysis device.

In a possible design, the performing, by the surveillance platform, load balancing processing on the intelligent analysis device includes:

if the intelligent analysis device is bound to the camera, reselecting, by the surveillance platform, a to-be-bound intelligent analysis device for one or more cameras bound to the intelligent analysis device;

sending, by the surveillance platform to the intelligent analysis device, a command for unbinding the one or more cameras from the intelligent analysis device;

sending, by the surveillance platform to the reselected to-be-bound intelligent analysis device, a command for binding the one or more cameras; and sending, by the intelligent analysis device to the one or more unbound cameras, a command for stopping sending a video stream.

According to the method for adjusting a resource of an intelligent analysis device provided in this implementation, the surveillance platform may dynamically bind the camera with only the image collection function to the appropriate intelligent analysis device based on the resource of the intelligent analysis device that accesses the surveillance platform. In a working process of the intelligent analysis device, if the surveillance platform finds an intelligent analysis device whose resource usage is greater than the resource usage threshold, the surveillance platform performs load balancing processing on the intelligent analysis device. A binding relationship between the camera and the intelligent analysis device may be dynamically adjusted, to resolve a problem of unbalanced utilization of the resource of the intelligent analysis device. This balances the resource of the intelligent analysis device in an entire system, improves the processing efficiency, and avoids the low efficiency caused by the manual processing.

In a possible design, the performing, by the surveillance platform, load balancing processing on the intelligent analysis device includes:

if the intelligent analysis device is not bound to the camera, selecting, by the surveillance platform, a to-be-bound target intelligent analysis device for the intelligent analysis device based on status information and application information of another intelligent analysis device that accesses the surveillance platform;

sending, by the surveillance platform to the target intelligent analysis device, a command for binding the intelligent analysis device;

sending, by the surveillance platform to the intelligent analysis device, a command for stopping processing some service applications; and receiving, by the intelligent analysis device, a video stream request sent by the target intelligent analysis device, and sending video streams of some service applications to the target intelligent analysis device.

According to the method for adjusting a resource of an intelligent analysis device provided in this implementation, the surveillance platform may dynamically bind the camera with only the image collection function to the appropriate intelligent analysis device based on the resource of the intelligent analysis device that accesses the surveillance platform. In the working process of the intelligent analysis device, if the surveillance platform finds an intelligent analysis device whose resource usage is greater than the resource usage threshold, the surveillance platform performs load balancing processing on the intelligent analysis device. Video streams of some service applications on the intelligent analysis device may be transferred to an intelligent analysis device bound to the intelligent analysis device for processing, to implement offloading. This resolves the problem of unbalanced utilization of the resource of the intelligent analysis device, balances the resource of the intelligent analysis device in the entire system, improves the processing efficiency, and avoids the low efficiency caused by the manual processing.

According to a thirteenth aspect, this application provides a surveillance management system, including a surveillance platform and an intelligent analysis device.

The intelligent analysis device is configured to: after accessing the surveillance platform, send, to the surveillance platform, status information of the intelligent analysis device and application information deployed on the intelligent analysis device, where the status information includes resource usage and a quantity of bound cameras.

The surveillance platform is configured to: after a camera accesses the surveillance platform, select a to-be-bound intelligent analysis device for the camera based on the status information and the application information of the intelligent analysis device that accesses the surveillance platform.

The surveillance platform is further configured to send, to the selected intelligent analysis device, a command for binding the camera.

The intelligent analysis device that receives the command for binding the camera is configured to send a video stream request to the camera, receive a video stream sent by the camera, and analyze and process the received video stream.

In a possible design, the surveillance platform is specifically configured to:

select, through polling from intelligent analysis devices whose resource usages are less than a resource usage threshold and whose application information matches the camera, an intelligent analysis device to be bound to the camera; or select, from intelligent analysis devices whose resource usages are less than a resource usage threshold and whose application information matches the camera, an intelligent analysis device closest to the camera to be bound to the camera; or select, from intelligent analysis devices whose resource usages are less than a resource usage threshold and whose application information matches the camera, an intelligent analysis device with lowest resource usage to be bound to the camera.

In a possible design, the surveillance platform is further configured to send a status information obtaining request to the intelligent analysis device; and the intelligent analysis device is further configured to send the status information of the intelligent analysis device to the surveillance platform.

In a possible design, when the resource usage of the intelligent analysis device that accesses the surveillance platform is greater than the resource usage threshold, the surveillance platform is further configured to perform load balancing processing on the intelligent analysis device.

In a possible design, the surveillance platform is specifically configured to:

if the intelligent analysis device is bound to the camera, reselect a to-be-bound intelligent analysis device for one or more cameras bound to the intelligent analysis device;

send, to the intelligent analysis device, a command for unbinding the one or more cameras from the intelligent analysis device; and send, to the reselected to-be-bound intelligent analysis device, a command for binding the one or more cameras.

The intelligent analysis device is further configured to send, to the one or more unbound cameras, a command for stopping sending a video stream.

In a possible design, the surveillance platform is specifically configured to:

if the intelligent analysis device is not bound to the camera, select a to-be-bound target intelligent analysis device for the intelligent analysis device based on status information and application information of another intelligent analysis device that accesses the surveillance platform;

send, to the target intelligent analysis device, a command for binding the intelligent analysis device; and send, to the intelligent analysis device, a command for stopping processing some service applications.

The intelligent analysis device is further configured to receive a video stream request sent by the target intelligent analysis device, and send video streams of some service applications to the target intelligent analysis device.

For beneficial effects of the system provided in the thirteenth aspect and the possible designs of the thirteenth aspect, refer to the beneficial effects brought by the twelfth aspect and the possible implementations of the twelfth aspect. Details are not described herein again.

DESCRIPTION OF EMBODIMENTS

Compared with a common camera, the smart camera requires complex intelligent processing. Therefore, more powerful hardware resources and deployment of software that can perform intelligent processing are required, which is costly. To fully use hardware and software resources of the smart camera, a 1+N mode of the smart camera is proposed. According to the mode, the smart camera accesses video streams from N common cameras. The smart camera processes a video stream collected by itself and at the same time, can perform intelligent processing on the video streams, from the N common cameras, accessed by the smart camera. This implements intelligent reconstruction of the common camera. During the intelligent processing performed by the smart camera, resource consumption is closely related to data collected by the camera. For example, during face analysis, three different images cause greatly different resource consumption, and the three different images are respectively an image without a face, an image with one face, and an image with a large number of faces. Therefore, different deployment positions of the camera may result in unbalanced resource utilization. For example, resources of the smart camera at some positions may be overloaded, but the smart camera works at low load for a long time period at other positions. Therefore, the 1+N mode of the smart camera increases possibility of the unbalanced resource utilization.

A problem of the unbalanced resource utilization is resolved by manually adjusting a binding relationship between the smart camera and the common camera. However, a response speed of the manual manner is slow, and processing efficiency is low.

Figure 1:
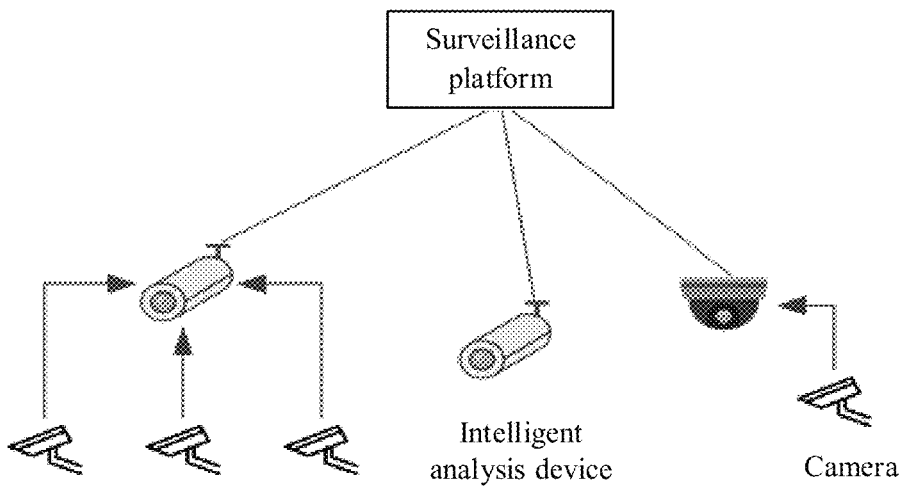
FIG. 1 is a schematic diagram of a structure of a surveillance management system according to this application.

A method for adjusting a resource of an intelligent analysis device and an apparatus provided in this application may be applied to a surveillance management system including a surveillance platform and an intelligent analysis device. FIG. 1 is a schematic diagram of a structure of the surveillance management system according to this application. As shown in FIG. 1, network elements related to the surveillance management system in this application are the intelligent analysis device, a camera, and the surveillance platform. The intelligent analysis device is a device that has functions such as image analysis, image processing, video analysis, and video processing. The intelligent analysis device may further have an image collection function. For example, the intelligent analysis device may be a smart camera. The camera in this application has only the image collection function. The camera in this application may be various types of cameras, or may be a camera lens. The surveillance platform is any software or hardware that can perform the method for adjusting a resource of an intelligent analysis device provided in this application. In the surveillance management system shown in FIG. 1, after the intelligent analysis device accesses the surveillance platform, the intelligent analysis device reports status information and deployed application information of the intelligent analysis device to the surveillance platform. After the camera accesses the surveillance management system, the surveillance platform selects a to-be-bound intelligent analysis device for the camera for binding. After the intelligent analysis device works, the surveillance platform may perform load balancing processing on the intelligent analysis device based on a change of resource usage of the intelligent analysis device. The following describes solutions in this application in detail with reference to accompanying drawings.

Figure 2:
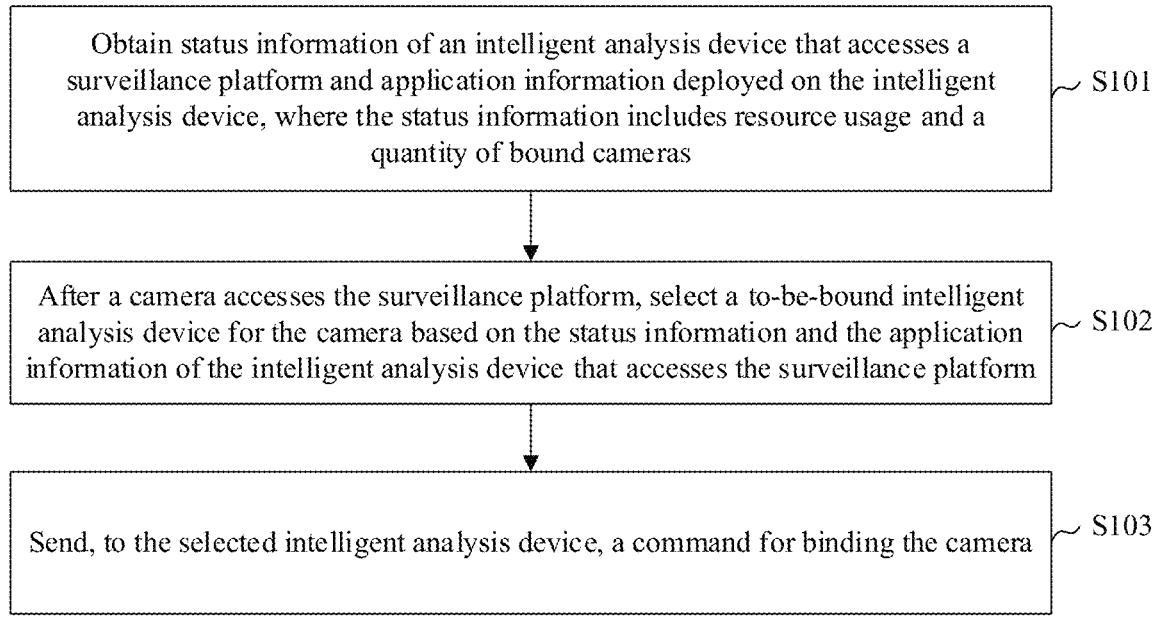
FIG. 2 is a flowchart of an embodiment of a method for adjusting a resource of an intelligent analysis device according to this application.

FIG. 2 is a flowchart of an embodiment of a method for adjusting a resource of an intelligent analysis device according to this application. This embodiment may be performed by a surveillance platform. As shown in FIG. 2, the method in this embodiment may include the following steps.

S101: Obtain status information of an intelligent analysis device that accesses the surveillance platform and application information deployed on the intelligent analysis device, where the status information includes resource usage and a quantity of bound cameras.

Specifically, after the intelligent analysis device accesses the surveillance platform, the surveillance platform may directly obtain the application information deployed on the intelligent analysis device. The application information is an application function of the intelligent analysis device, for example, facial recognition, license plate recognition, recognition of a thrown object, intrusion detection, and automatic tracking. Specifically, after accessing the surveillance platform, the intelligent analysis device may actively report the application information of the intelligent analysis device. Alternatively, after the intelligent analysis device accesses the surveillance platform, the surveillance platform requests the intelligent analysis device to report the application information of the intelligent analysis device. After obtaining the application information of the intelligent analysis device, the surveillance platform stores the application information.

The status information includes the resource usage and the quantity of bound cameras. The resource usage may be usage of a central processing unit (CPU) and a memory. After the intelligent analysis device accesses the surveillance platform, a quantity of bound cameras in initial status information is 0. Optionally, in S101, there are two implementations for the surveillance platform to obtain the status information of the intelligent analysis device that accesses the surveillance platform. One implementation may specifically include:

sending a status information obtaining request to the intelligent analysis device that accesses the surveillance platform, where optionally, the status information obtaining request may be periodically sent (in other words, the surveillance platform periodically triggers the intelligent analysis device to report the status information of the intelligent analysis device), or the status information obtaining request is randomly sent, or the status information obtaining request is sent after an event is triggered, or the status information obtaining request is sent through manual controlling; and receiving the status information sent by the intelligent analysis device that accesses the surveillance platform.

The other implementation may specifically include: receiving the status information sent by the intelligent analysis device that accesses the surveillance platform after the status information is updated. In this implementation, the intelligent analysis device actively reports the status information to the surveillance platform after the status information is updated.

It should be noted that, after the intelligent analysis device accesses the surveillance platform, the application information and the initial status information may be reported to the surveillance platform at the same time, or may be separately reported to the surveillance platform.

The application information is reported only once. Optionally, the initial status information further includes a maximum quantity of cameras that may be bound to the intelligent analysis device.

In this embodiment, the intelligent analysis device provides, for the surveillance platform, an application programming interface (API) controlled by media processing. The intelligent analysis device and the surveillance platform communicate with each other over a standard protocol, and the standard protocol may be, for example, OVIF or T28181. The intelligent analysis device may access the surveillance platform through the API interface.

S102: After a camera accesses the surveillance platform, select a to-be-bound intelligent analysis device for the camera based on the status information and the application information of the intelligent analysis device that accesses the surveillance platform.

Figure 3:
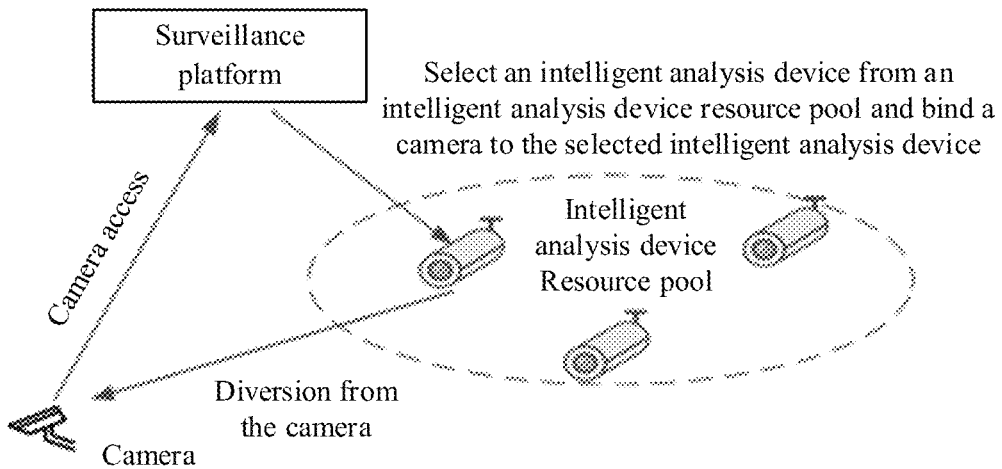
FIG. 3 is a schematic diagram in which a surveillance platform binds a camera after the camera accesses the surveillance platform.

Specifically, the camera also provides an API interface for the surveillance platform. The camera and the surveillance platform communicate with each other over the standard protocol, and the standard protocol may be, for example, OVIF or T28181. The camera may access the surveillance platform through the API interface. Intelligent analysis devices that access the surveillance platform form an intelligent analysis device resource pool. FIG. 3 is a schematic diagram in which the surveillance platform binds the camera after the camera accesses the surveillance platform. As shown in FIG. 3, after the camera accesses the surveillance platform, the surveillance platform selects an intelligent analysis device from the intelligent analysis device resource pool, and binds the camera to the intelligent analysis device.

In this embodiment, specifically, the surveillance platform selects the to-be-bound intelligent analysis device for the camera based on the status information and the application information of the intelligent analysis device in a system and the maximum quantity of cameras that may be bound to the intelligent analysis device. First, the surveillance platform determines, based on the quantity of bound cameras of the intelligent analysis device and the maximum quantity of cameras that may be bound to the intelligent analysis device, whether to continue to bind a camera. If the camera may be bound, the surveillance platform selects a to-be-bound intelligent analysis device for the camera based on status information and application information of each intelligent analysis device in the system. Specifically, there are three implementations:

Implementation 1: Select, through polling from intelligent analysis devices whose resource usages are less than a resource usage threshold and whose application information matches the camera, an intelligent analysis device to be bound to the camera.

All intelligent analysis devices that access the surveillance platform may have a same resource usage threshold or may have different resource usage thresholds. Each intelligent analysis device corresponds to a resource usage threshold of the intelligent analysis device. For example, the resource usage threshold is 85% or 90%. That the application information matches the camera means that the selected intelligent analysis device to be bound may process a video stream of the camera.

Implementation 2: Select, from the intelligent analysis device whose resource usage is less than the resource usage threshold and whose application information matches the camera, an intelligent analysis device closest to the camera to be bound to the camera.

The "closest" may be closest to a geographic position.

Implementation 3: Select, from the intelligent analysis device whose resource usage is less than the resource usage threshold and whose application information matches the camera, an intelligent analysis device with lowest resource usage to be bound to the camera.

S103: Send, to the selected intelligent analysis device, a command for binding the camera.

Specifically, the command for binding the camera may alternatively be a binding request, a binding instruction, a binding notification, or the like. The command for binding the camera may be in a restful format or an rpc format. The command for binding the camera may include an IP address, a port, authentication information, an identification number, and a to-be-implemented service type (for example, facial recognition) that are of the to-be-bound camera. After receiving the command sent by the surveillance platform for binding the camera, the selected intelligent analysis device sends a video stream request to the camera, receives a video stream sent by the camera, and analyzes and processes the received video stream.

According to the method for adjusting a resource of an intelligent analysis device provided in this embodiment, the status information of the intelligent analysis device that accesses the surveillance platform and the application information deployed on the intelligent analysis device are obtained through the surveillance platform. After any camera accesses the surveillance platform, the surveillance platform selects the to-be-bound intelligent analysis device for the camera based on the status information and the application information of the intelligent analysis device that accesses the surveillance platform. The surveillance platform sends, to the selected intelligent analysis device, the command for binding the camera, so that the camera is bound to the intelligent analysis device. In this way, the surveillance platform may dynamically bind a camera with only an image collection function to an appropriate intelligent analysis device based on a resource of the intelligent analysis device that accesses the surveillance platform. The intelligent analysis device may analyze and process a video stream collected by the camera. In this way, the resource of the intelligent analysis device may be automatically allocated. This improves processing efficiency and avoids low efficiency caused by manual processing.

Figure 4:
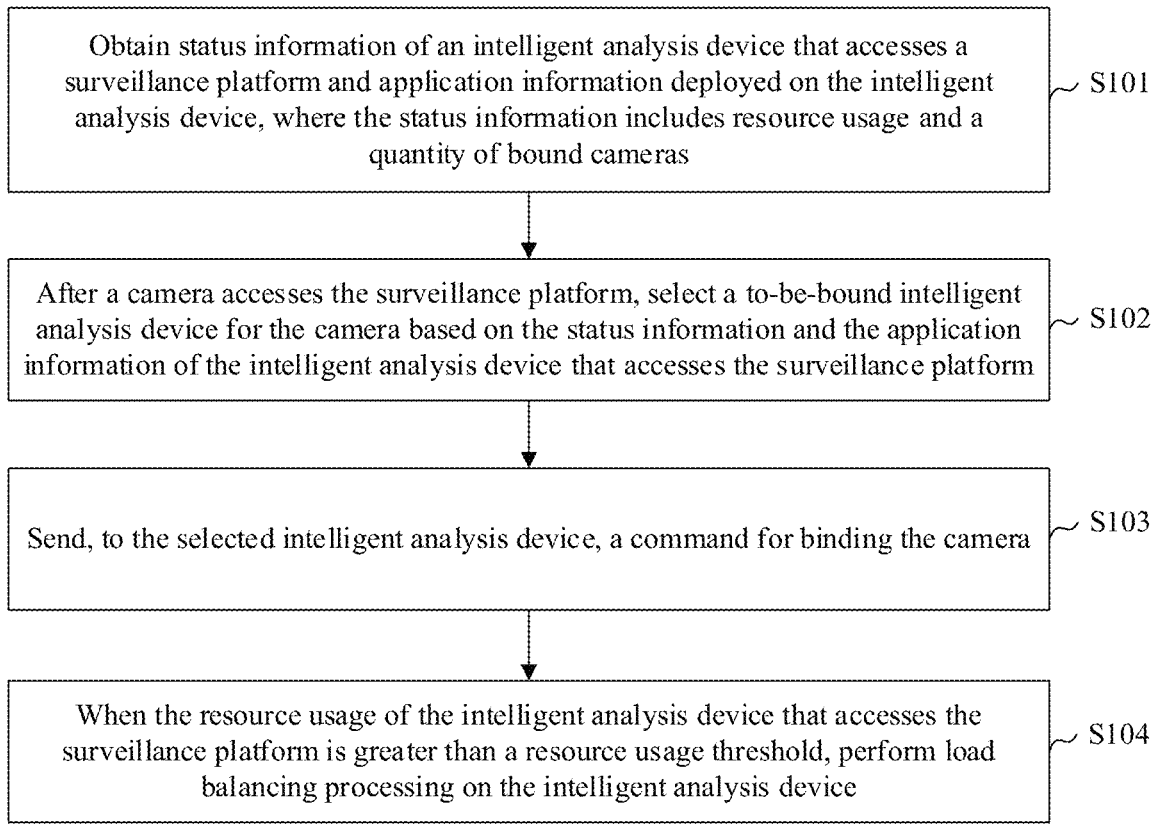
FIG. 4 is a flowchart of an embodiment of a method for adjusting a resource of an intelligent analysis device according to this application.

FIG. 4 is a flowchart of an embodiment of a method for adjusting a resource of an intelligent analysis device according to this application. This embodiment may be performed by the surveillance platform. As shown in FIG. 4, the method in this embodiment may further include the following step based on the method shown in FIG. 2.

S104: When the resource usage of the intelligent analysis device that accesses the surveillance platform is greater than the resource usage threshold, perform load balancing processing on the intelligent analysis device.

Specifically, in a working process of the intelligent analysis device, if the surveillance platform finds that resource allocation is unbalanced in the system (in other words, there is an intelligent analysis device whose resource usage is greater than the resource usage threshold), load balancing processing is performed on the intelligent analysis device. In S104, there are two specific implementations for performing the load balancing processing on the intelligent analysis device:

Implementation 1: If the intelligent analysis device is bound to the camera, performing, by the surveillance platform, the load balancing processing on the intelligent analysis device may be specifically: reselecting a to-be-bound intelligent analysis device for one or more cameras bound to the intelligent analysis device, sending, to the intelligent analysis device, a command for unbinding the one or more cameras from the intelligent analysis device; and sending, to the reselected to-be-bound intelligent analysis device, a command for binding the one or more cameras.

Specifically, the unbinding command may include an IP address, a port, and the like of a to-be-unbound camera. For an original intelligent analysis device, correspondingly, after receiving the command delivered by the surveillance platform for unbinding the one or more cameras from the intelligent analysis device, the original intelligent analysis device unbinds a corresponding camera, and sends, to the one or more unbound cameras, a command for stop sending a video stream. After receiving the command for binding the camera, the reselected to-be-bound intelligent analysis device sends a video stream to the bound camera, and analyzes and processes a received video stream.

Implementation 2: If the intelligent analysis device is not bound to the camera, performing, by the surveillance platform, the load balancing processing on the intelligent analysis device may be specifically: selecting a to-be-bound target intelligent analysis device for the intelligent analysis device based on status information and application information of another intelligent analysis device that accesses the surveillance platform; sending, to the target intelligent analysis device, a command for binding the intelligent analysis device, where the command is used to instruct the intelligent analysis device to be bound to the target intelligent analysis device, and the command for binding the intelligent analysis device may include an IP address, a port, and the like of the to-be-bound intelligent analysis device; and sending, to the intelligent analysis device, a command for stopping processing some service applications, where the command is used to instruct the intelligent analysis device to stop processing video streams of some service applications. In other words, the video streams of some service applications on the intelligent analysis device are transferred to the target intelligent analysis device that is bound to the intelligent analysis device.

Specifically, if the intelligent analysis device is not bound to the camera but runs a plurality of applications, the to-be-bound target intelligent analysis device is selected for the intelligent analysis device based on the status information and the application information of the other intelligent analysis device that accesses the surveillance platform. The to-be-bound target intelligent analysis device replaces the intelligent analysis device to process some applications. A to-be-processed application may be selected according to a predefined rule. The predefined rule is, for example, polling, selecting an application with minimum resource usage, selecting an application with maximum resource usage, or selecting an application with medium resource usage.

For the intelligent analysis device whose resource usage is greater than the resource usage threshold, correspondingly, the intelligent analysis device receives a video stream request sent by the target intelligent analysis device bound to the intelligent analysis device. The target intelligent analysis device is selected by the surveillance platform for the intelligent analysis device based on the status information and the application information of the other intelligent analysis device that accesses the surveillance platform. The intelligent analysis device receives the command sent by the surveillance platform for stopping processing some service applications. The intelligent analysis device sends the video streams of some service applications to the target intelligent analysis device. Correspondingly, the target intelligent analysis device receives the command sent by the surveillance platform for binding the intelligent analysis device. The target intelligent analysis device sends the video stream request to the intelligent analysis device, and analyzes and processes the received video streams, of some service applications, sent by the intelligent analysis device.

According to the method for adjusting a resource of an intelligent analysis device provided in this embodiment, the surveillance platform may dynamically bind the camera with only the image collection function to the appropriate intelligent analysis device based on the resource of the intelligent analysis device that accesses the surveillance platform. In the working process of the intelligent analysis device, if the surveillance platform finds an intelligent analysis device whose resource usage is greater than the resource usage threshold, the surveillance platform performs load balancing processing on the intelligent analysis device. A binding relationship between the camera and the intelligent analysis device may be dynamically adjusted. In addition, video streams of some service applications on the intelligent analysis device may be transferred to an intelligent analysis device bound to the intelligent analysis device for processing, to implement offloading. This resolves a problem of unbalanced utilization of the resource of the intelligent analysis device, balances the resource of the intelligent analysis device in the entire system, improves the processing efficiency, and avoids the low efficiency caused by the manual processing.

Two specific embodiments are used in the following to describe in detail the technical solutions of the method embodiments shown in FIG. 1 and FIG. 3.

Figure 5:
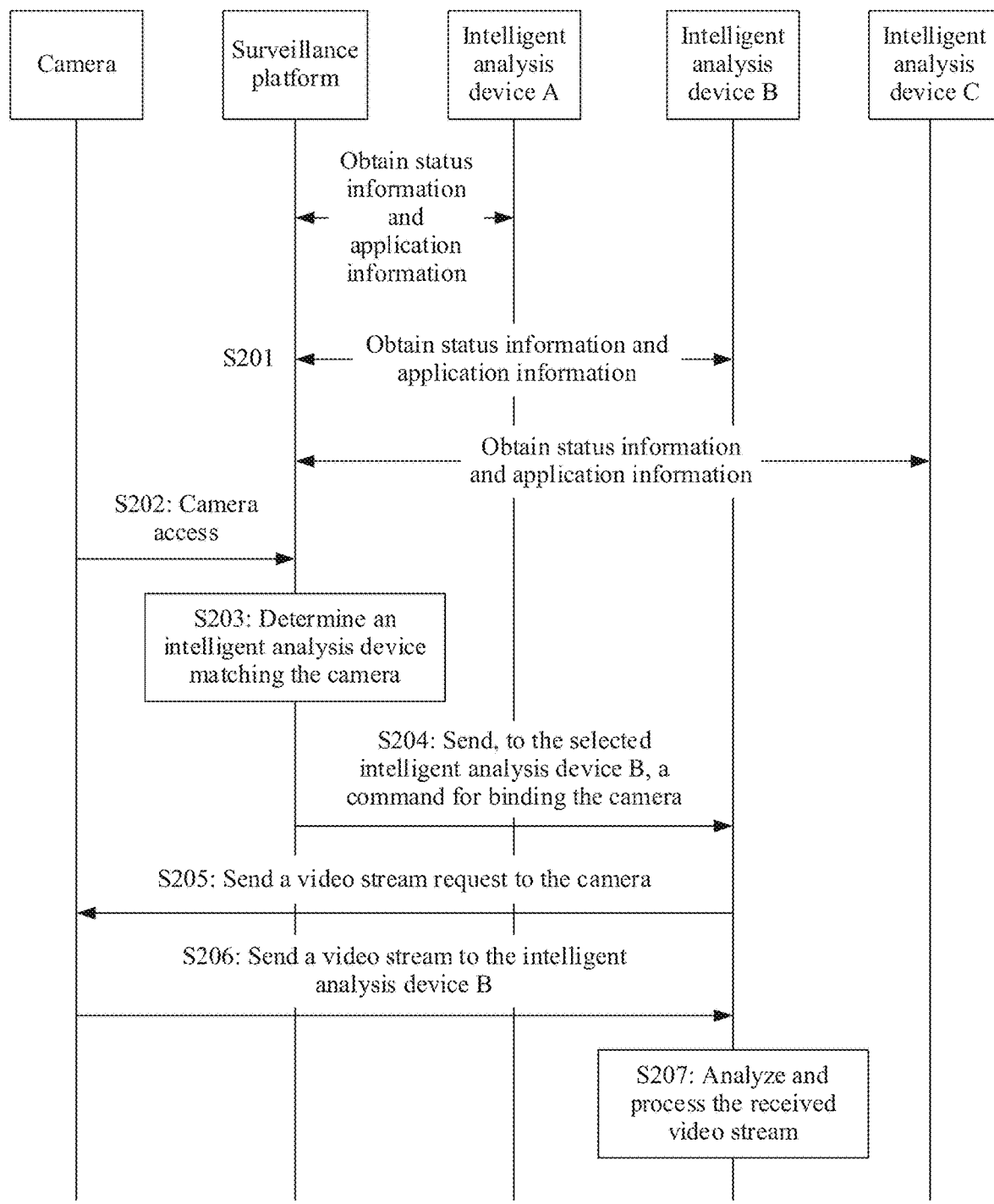
FIG. 5 is an interaction flowchart of an embodiment of a method for adjusting a resource of an intelligent analysis device according to this application.

FIG. 5 is an interaction flowchart of an embodiment of a method for adjusting a resource of an intelligent analysis device according to this application. As shown in FIG. 5, in this embodiment, for example, there are three intelligent analysis devices that access a surveillance platform. The method in this embodiment may include the following steps.

S201: The surveillance platform obtains status information of an intelligent analysis device A that accesses the surveillance platform and application information deployed on the intelligent analysis device A, status information of an intelligent analysis device B that accesses the surveillance platform and application information deployed on the intelligent analysis device B, and status information of an intelligent analysis device C that accesses the surveillance platform and application information deployed on the intelligent analysis device C, where the status information includes resource usage and a quantity of bound cameras.

Specifically, there are two implementations:

Implementation 1: The surveillance platform sends a status information obtaining request to the intelligent analysis device. After receiving the status information obtaining request, the intelligent analysis device sends the status information of the intelligent analysis device to the surveillance platform.

Implementation 2: The intelligent analysis device sends updated status information to the surveillance platform after the status information is updated.

S202: A camera accesses the surveillance platform.

S203: The surveillance platform determines an application, corresponding to intelligent analysis processing, required by the camera, and determines, based on the application information deployed on the intelligent analysis device, an intelligent analysis device matching the camera.

In this embodiment, for example, the intelligent analysis device A, the intelligent analysis device B, and the intelligent analysis device C may all process a video stream of the camera.

S204: The surveillance platform selects a to-be-bound intelligent analysis device for the camera based on the status information of the intelligent analysis device A and the application information deployed on the intelligent analysis device A, the status information of the intelligent analysis device B and the application information deployed on the intelligent analysis device B, and the status information of the intelligent analysis device C and the application information deployed on the intelligent analysis device C, and sends, to the intelligent analysis device, a command for binding the camera.

Specifically, an intelligent analysis device may be selected, through polling from intelligent analysis devices whose resource usages are less than a resource usage threshold, to be bound to the camera; or an intelligent analysis device closest to the camera may be selected, from the intelligent analysis device whose resource usage is less than the resource usage threshold, to be bound to the camera; or an intelligent analysis device with lowest resource usage may be selected, from the intelligent analysis device whose resource usage is less than the resource usage threshold, to be bound to the camera.

In this embodiment, for example, if the intelligent analysis device B is selected, the camera is bound to the intelligent analysis device B, and the command for binding the camera is sent to the intelligent analysis device B.

S205: The intelligent analysis device B sends a video stream request to the camera.

S206: The camera sends the video stream to the intelligent analysis device B.

S207: The intelligent analysis device B analyzes and processes the received video stream.

Figure 6:
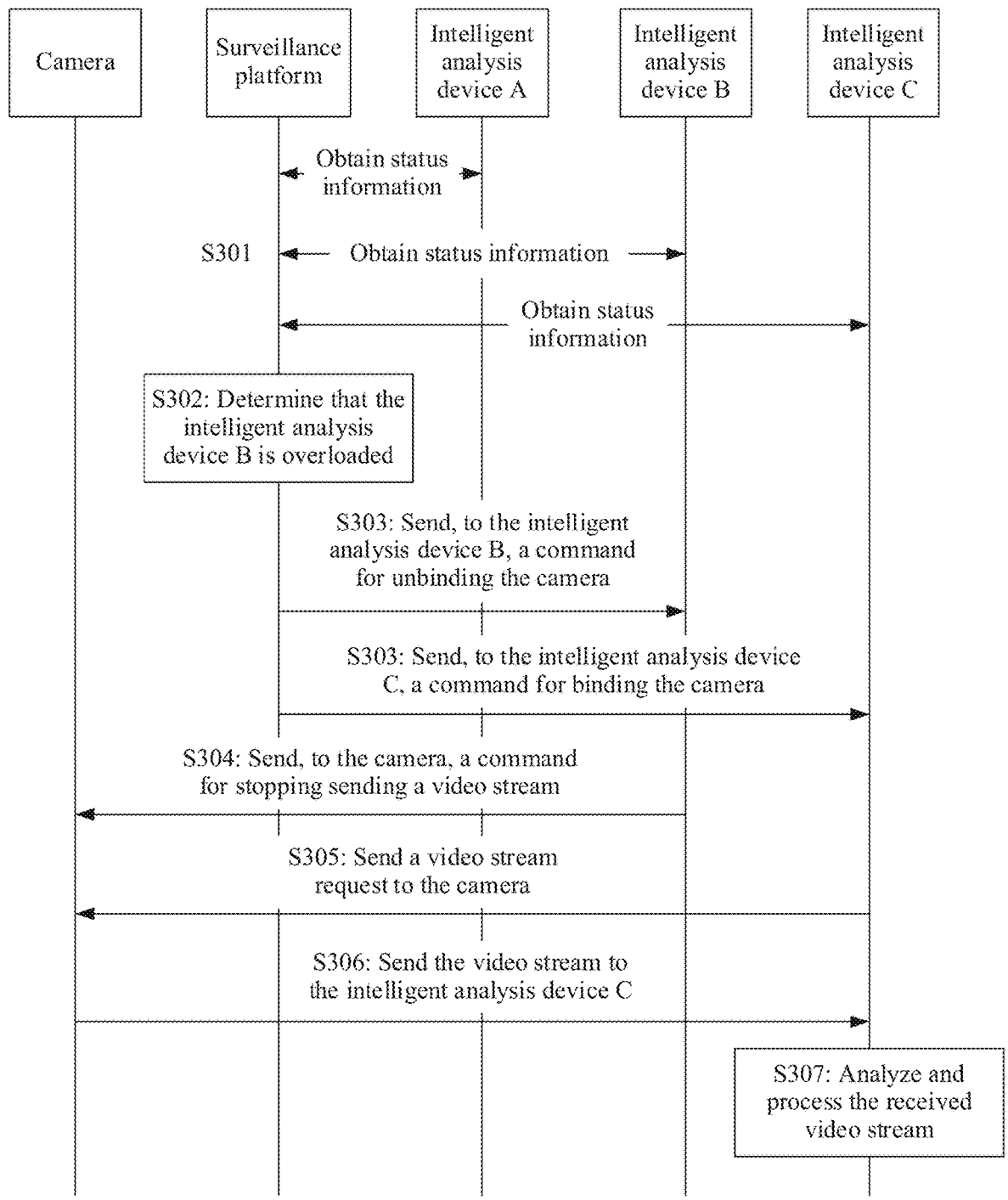
FIG. 6 is an interaction flowchart of an embodiment of a method for adjusting a resource of an intelligent analysis device according to this application.

FIG. 6 is an interaction flowchart of an embodiment of a method for adjusting a resource of an intelligent analysis device according to this application. As shown in FIG. 6, in this embodiment, for example, there are the three intelligent analysis devices that access the surveillance platform. This embodiment is described by using an example in which a binding relationship between the camera and the intelligent analysis device is dynamically adjusted to perform load balancing processing. Based on the method shown in FIG. 5, the method in this embodiment may further include the following steps.

S301: The surveillance platform obtains the status information of the intelligent analysis device A that accesses the surveillance platform, the status information of the intelligent analysis device B that accesses the surveillance platform, and the status information of the intelligent analysis device C that accesses the surveillance platform.

Specifically, one of the two implementations in the embodiment shown in FIG. 5 may be used.

S302: The surveillance platform determines, based on the status information of the intelligent analysis device A, that of the intelligent analysis device B, and that of the intelligent analysis device C, that resource usage of the intelligent analysis device B is greater than the resource usage threshold (in other words, the intelligent analysis device B is overloaded).

S303: If the intelligent analysis device B is bound to the camera, reselect a to-be-bound intelligent analysis device for one or more cameras bound to the intelligent analysis device B. For example, as shown in FIG. 6, a camera is used as an example. The surveillance platform unbinds the intelligent analysis device B from the camera, and selects the intelligent analysis device C to be bound to the camera. The surveillance platform sends, to the intelligent analysis device C, a command for binding the camera, and sends, to the intelligent analysis device B, a command for unbinding the camera. Usually, the unbinding command includes an IP address and a port of the to-be-unbound camera.

S304: The intelligent analysis device B sends, to the unbound camera, a command for stopping sending the video stream.

S305: The intelligent analysis device C sends a video stream request to the camera.

S306: The camera sends the video stream to the intelligent analysis device C.

S307: The intelligent analysis device C analyzes and processes the received video stream.

Figure 7A:
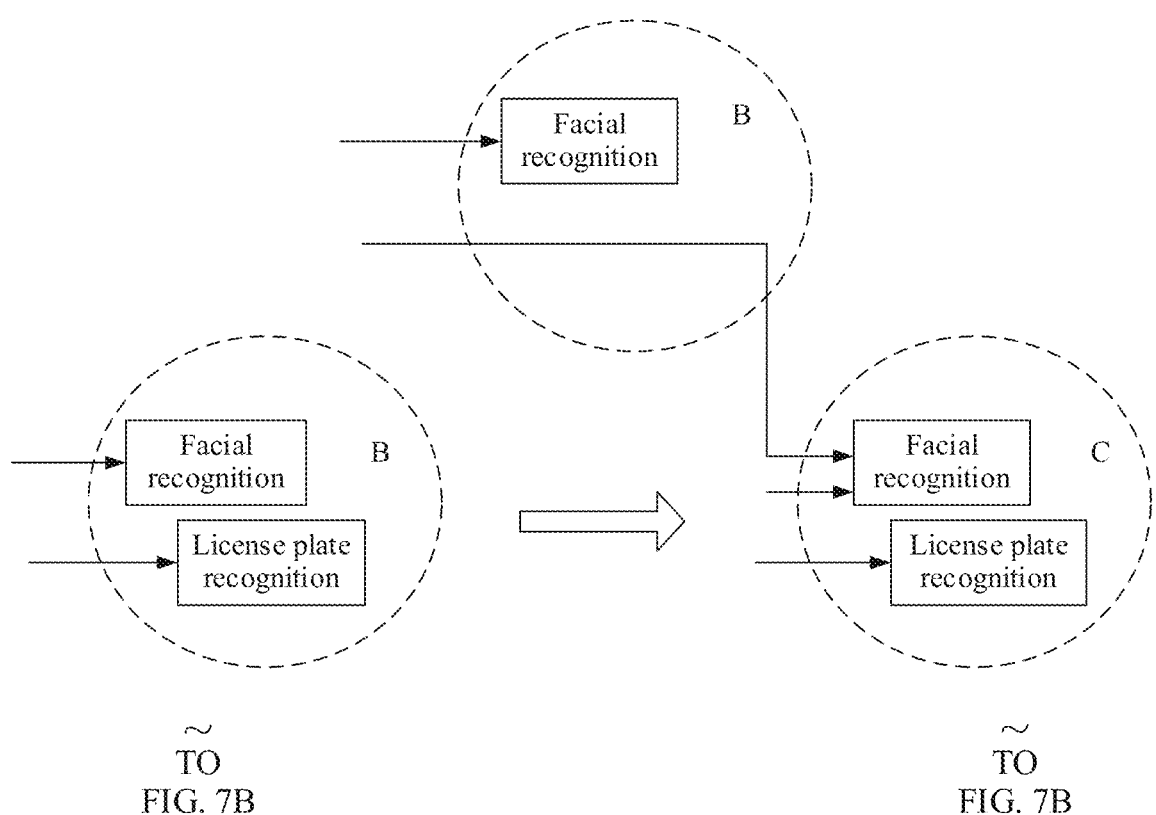
FIG. 7A and FIG. 7B are an interaction flowchart of an embodiment of a method for adjusting a resource of an intelligent analysis device according to this application.
Figure 7B:
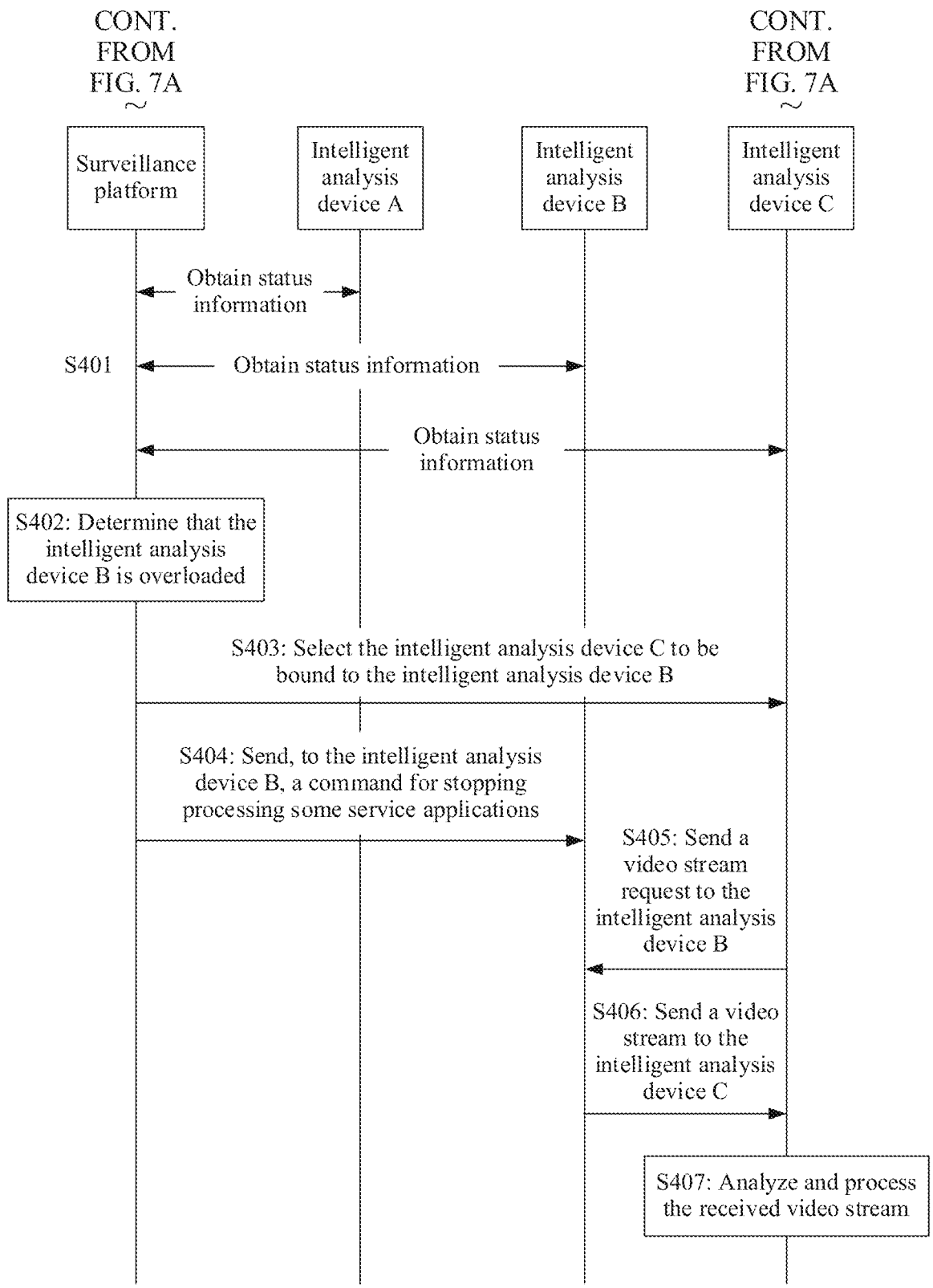

FIG. 7A and FIG. 7B are an interaction flowchart of an embodiment of a method for adjusting a resource of an intelligent analysis device according to this application. As shown in FIG. 7A and FIG. 7B, in this embodiment, for example, there are the three intelligent analysis devices that access the surveillance platform. This embodiment is described by using an example in which some service applications on an overloaded intelligent analysis device are switched to an intelligent analysis device bound to the intelligent analysis device, to perform load balancing processing. Based on the method shown in FIG. 5, the method in this embodiment may further include the following steps.

S401: The surveillance platform obtains the status information of the intelligent analysis device A that accesses the surveillance platform, the status information of the intelligent analysis device B that accesses the surveillance platform, and the status information of the intelligent analysis device C that accesses the surveillance platform.

Specifically, one of the two implementations in the embodiment shown in FIG. 5 may be used.

S402: The surveillance platform determines, based on the status information of the intelligent analysis device A, that of the intelligent analysis device B, and that of the intelligent analysis device C, that the resource usage of the intelligent analysis device B is greater than the resource usage threshold (in other words, the intelligent analysis device B is overloaded).

S403: If the intelligent analysis device B is not bound to the camera, the surveillance platform selects a to-be-bound intelligent analysis device for the intelligent analysis device B based on the status information and the application information of the intelligent analysis device A and those of the intelligent analysis device C.

For example, if the selected to-be-bound intelligent analysis device is the intelligent analysis device C, the surveillance platform sends, to the intelligent analysis device C, a command for binding the intelligent analysis device B. The intelligent analysis device C sends a video stream request to the intelligent analysis device B.

The surveillance platform transfers video streams of some service applications on the intelligent analysis device B to the intelligent analysis device C that is bound to the intelligent analysis device B.

As shown in FIG. 7A and FIG. 7B, for example, the service applications being processed on the intelligent analysis device B are facial recognition and license plate recognition. The surveillance platform forwards a video stream of the service application (namely, the license plate recognition) on the intelligent analysis device B to the intelligent analysis device C. The intelligent analysis device B processes only the facial recognition, and the intelligent analysis device C processes the license plate recognition and the facial recognition.

S404: The surveillance platform sends, to the intelligent analysis device B, a command for stopping processing some service applications.

S405: The intelligent analysis device C sends the video stream request to the intelligent analysis device B.

S406: The intelligent analysis device B sends the video stream to the intelligent analysis device C.

S407: The intelligent analysis device C analyzes and processes the received video stream.

Figure 8:
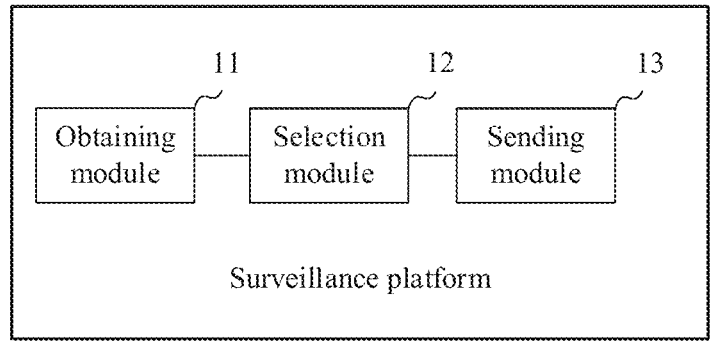
FIG. 8 is a schematic diagram of a structure of a surveillance platform according to this application.

FIG. 8 is a schematic diagram of a structure of a surveillance platform according to this application. As shown in FIG. 8, the apparatus in this embodiment may include an obtaining module 11, a selection module 12, and a sending module 13.

The obtaining module 11 is configured to obtain status information of an intelligent analysis device that accesses the surveillance platform and application information deployed on the intelligent analysis device. The status information includes resource usage and a quantity of bound cameras.

The selection module 12 is configured to: after a camera accesses the surveillance platform, select a to-be-bound intelligent analysis device for the camera based on the status information and the application information of the intelligent analysis device that accesses the surveillance platform.

The sending module 13 is configured to send, to the selected intelligent analysis device, a command for binding the camera.

Optionally, the selection module 12 is configured to:

select, through polling from intelligent analysis devices whose resource usages are less than a resource usage threshold and whose application information matches the camera, an intelligent analysis device to be bound to the camera; or select, from intelligent analysis devices whose resource usages are less than a resource usage threshold and whose application information matches the camera, an intelligent analysis device closest to the camera to be bound to the camera; or select, from intelligent analysis devices whose resource usages are less than a resource usage threshold and whose application information matches the camera, an intelligent analysis device with lowest resource usage to be bound to the camera.

Optionally, the obtaining module 11 is configured to:

send a status information obtaining request to the intelligent analysis device that accesses the surveillance platform; and receive the status information sent by the intelligent analysis device that accesses the surveillance platform.

The apparatus in this embodiment may be the surveillance platform, and may be configured to perform the technical solution in the method embodiment shown in FIG. 1. An implementation principle of the apparatus is similar to that of the method embodiment. Details are not described herein again.

According to the surveillance platform provided in this embodiment, the status information of the intelligent analysis device that accesses the surveillance platform and the application information deployed on the intelligent analysis device are obtained through the obtaining module. After any camera accesses the surveillance platform, the selection module selects the to-be-bound intelligent analysis device for the camera based on the status information and the application information of the intelligent analysis device that accesses the surveillance platform. The sending module sends, to the selected intelligent analysis device, the command for binding the camera, so that the camera is bound to the intelligent analysis device. In this way, the surveillance platform may dynamically bind a camera with only an image collection function to an appropriate intelligent analysis device based on a resource of the intelligent analysis device that accesses the surveillance platform. The intelligent analysis device may analyze and process a video stream collected by the camera. In this way, the resource of the intelligent analysis device may be automatically allocated. This improves processing efficiency and avoids low efficiency caused by manual processing.

Figure 9:
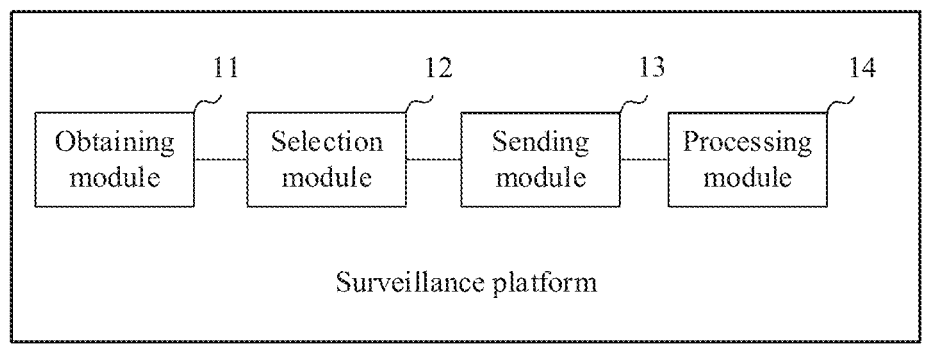
FIG. 9 is a schematic diagram of a structure of a surveillance platform according to this application.

FIG. 9 is a schematic diagram of a structure of a surveillance platform according to this application. As shown in FIG. 9, based on a structure of the apparatus shown in FIG. 8, the apparatus in this embodiment may further include a processing module 14. The processing module 14 is configured to: when the resource usage of the intelligent analysis device that accesses the surveillance platform is greater than the resource usage threshold, perform load balancing processing on the intelligent analysis device.

Optionally, the processing module 14 is configured to:

if the intelligent analysis device is bound to the camera, reselect a to-be-bound intelligent analysis device for one or more cameras bound to the intelligent analysis device, where the sending module 13 is further configured to send, to the intelligent analysis device, a command for unbinding the one or more cameras from the intelligent analysis device; and the sending module 13 is further configured to send, to the reselected to-be-bound intelligent analysis device, a command for binding the one or more cameras.

Optionally, the processing module 14 is configured to:

if the intelligent analysis device is not bound to the camera, select a to-be-bound target intelligent analysis device for the intelligent analysis device based on status information and application information of another intelligent analysis device that accesses the surveillance platform;

send, to the target intelligent analysis device, a command for binding the intelligent analysis device; and send, to the intelligent analysis device, a command for stopping processing some service applications.

The apparatus in this embodiment may be configured to perform the technical solution in the method embodiment shown in FIG. 4. An implementation principle of the apparatus is similar to that of the method embodiment. Details are not described herein again.

According to the surveillance platform provided in this embodiment, the surveillance platform may dynamically bind the camera with only the image collection function to the appropriate intelligent analysis device based on the resource of the intelligent analysis device that accesses the surveillance platform. In a working process of the intelligent analysis device, if the surveillance platform finds an intelligent analysis device whose resource usage is greater than the resource usage threshold, the surveillance platform performs load balancing processing on the intelligent analysis device. A binding relationship between the camera and the intelligent analysis device may be dynamically adjusted. In addition, video streams of some service applications on the intelligent analysis device may be transferred to an intelligent analysis device bound to the intelligent analysis device for processing, to implement offloading. This resolves a problem of unbalanced utilization of the resource of the intelligent analysis device, balances the resource of the intelligent analysis device in an entire system, improves the processing efficiency, and avoids the low efficiency caused by the manual processing.

Figure 10:
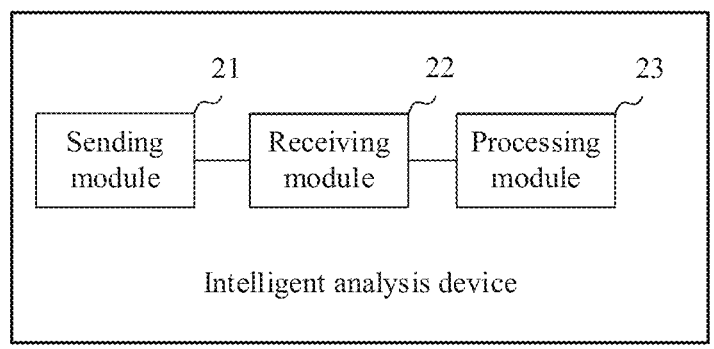
FIG. 10 is a schematic diagram of a structure of an intelligent analysis device according to this application.

FIG. 10 is a schematic diagram of a structure of an intelligent analysis device according to this application. As shown in FIG. 10, the intelligent analysis device in this embodiment may include a sending module 21, a receiving module 22, and a processing module 23. The sending module 21 is configured to: after the intelligent analysis device accesses a surveillance platform, send, to the surveillance platform, status information of the intelligent analysis device and application information deployed on the intelligent analysis device, where the status information includes resource usage and a quantity of bound cameras.

The receiving module 22 is configured to receive a command sent by the surveillance platform for binding a target camera.

The sending module 21 is further configured to send a video stream request to the target camera.

The receiving module 22 is further configured to receive a video stream sent by the target camera.

The processing module 23 is configured to analyze and process the received video stream.

The receiving module 22 is further configured to receive a status information obtaining request sent by the surveillance platform.

The sending module 21 is further configured to send the status information of the intelligent analysis device to the surveillance platform.

Further, when the resource usage of the intelligent analysis device is greater than a resource usage threshold, the receiving module 22 is further configured to:

receive a video stream request sent by a target intelligent analysis device bound to the intelligent analysis device, where the target intelligent analysis device is selected by the surveillance platform for the intelligent analysis device based on status information and application information of another intelligent analysis device that accesses the surveillance platform; and receive a command sent by the surveillance platform for stopping processing some service applications.

The sending module 21 is further configured to send video streams of some service applications to the target intelligent analysis device.

The apparatus in this embodiment may be configured to perform the technical solution in the method embodiment shown in FIG. 1 or FIG. 4. An implementation principle of the apparatus is similar to that of the method embodiment. Details are not described herein again.

According to the intelligent analysis device provided in this embodiment, after the intelligent analysis device accesses the surveillance platform, the sending module sends, to the surveillance platform, the status information of the intelligent analysis device and the application information deployed on the intelligent analysis device. The receiving module receives the command sent by the surveillance platform for binding the target camera. The sending module sends the video stream request to the target camera, and the receiving module receives the video stream sent by the target camera. Finally, the processing module analyzes and processes the received video stream. In this way, a resource of the intelligent analysis device may be automatically allocated. This improves processing efficiency and avoids low efficiency caused by manual processing.

In this application, function modules in the sending device may be obtained through division based on the foregoing method examples. For example, each function module corresponding to each function may be obtained through division, or two or more functions may be integrated into one processing module. The integrated module may be implemented in a form of hardware, or may be implemented in a form of a software function module. It should be noted that, in the embodiments of this application, division into the modules is used as an example, and is merely logical function division. In an actual implementation, another division manner may be used.

Figure 11:
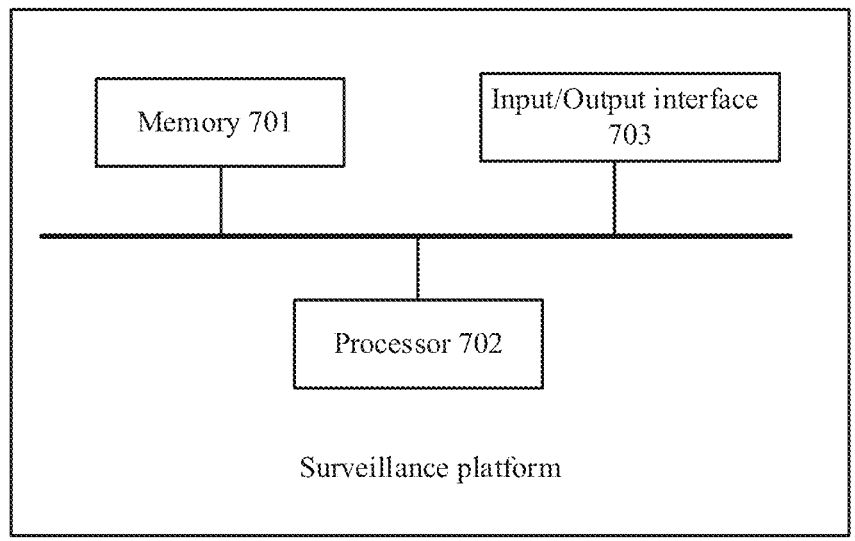
FIG. 11 is a schematic diagram of a structure of a surveillance platform according to this application.

FIG. 11 is a schematic diagram of a structure of a surveillance platform according to this application. The surveillance platform 700 includes: a memory 701, configured to store a program instruction, where the memory 701 may be a flash (flash memory); and a processor 702, configured to invoke and execute the program instructions in the memory, to implement steps in the method for adjusting a resource of an intelligent analysis device in FIG. 1 or FIG. 4. For details, refer to related descriptions in the foregoing method embodiments.

The surveillance platform 700 may further include an input/output interface 703. The input/output interface 703 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The surveillance platform may be configured to perform steps and/or procedures corresponding to the surveillance platform in the foregoing method embodiments.

Figure 12:
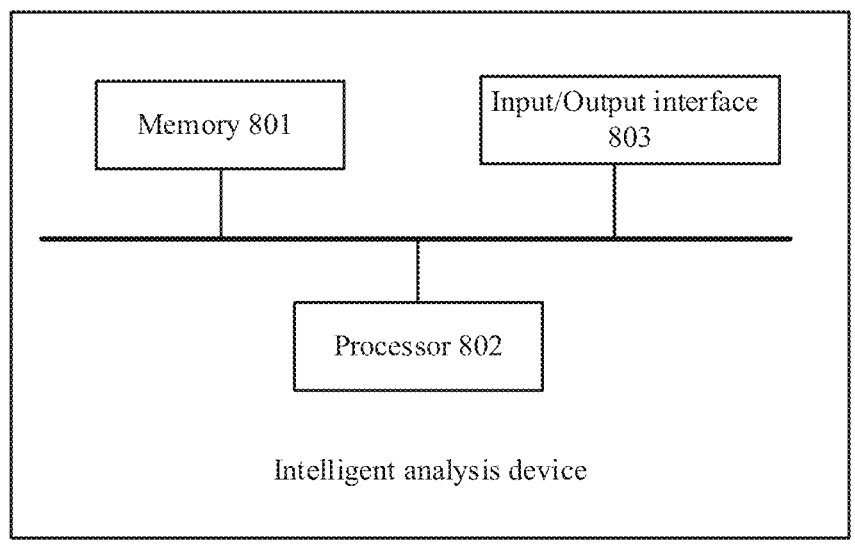
FIG. 12 is a schematic diagram of a structure of an intelligent analysis device according to this application.

FIG. 12 is a schematic diagram of a structure of an intelligent analysis device according to this application. The intelligent analysis device 800 includes:

a memory 801, configured to store a program instructions, where the memory 801 may be a flash (flash memory); and a processor 802, configured to invoke and execute the program instructions in the memory, to implement steps in the method for adjusting a resource of an intelligent analysis device in FIG. 1 or FIG. 4. For details, refer to related descriptions in the foregoing method embodiments.

The intelligent analysis device 800 may further include an input/output interface 803. The input/output interface 803 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The intelligent analysis device may be configured to perform steps and/or procedures corresponding to the intelligent analysis device in the foregoing method embodiments.

This application further provides a readable storage medium. The readable storage medium stores an executable instruction. When at least one processor of a surveillance platform executes the executable instructions, the surveillance platform performs the method for adjusting a resource of an intelligent analysis device in the foregoing method embodiments.

This application further provides a readable storage medium. The readable storage medium stores an executable instruction. When at least one processor of an intelligent analysis device executes the executable instructions, the intelligent analysis device performs the method for adjusting a resource of an intelligent analysis device in the foregoing method embodiments.

This application further provides a chip. The chip is connected to a memory, or the memory is integrated on the chip. When a software program stored in the memory is executed, the method for adjusting a resource of an intelligent analysis device in the foregoing method embodiments is implemented.

This application further provides a program product. The program product includes an executable instruction, and the executable instructions is stored in a readable storage medium. At least one processor of a surveillance platform may read the executable instructions from the readable storage medium. The at least one processor executes the executable instructions, so that the surveillance platform is enabled to implement the method for adjusting a resource of an intelligent analysis device in the foregoing method embodiments.

This application further provides a program product. The program product includes an executable instruction, and the executable instructions is stored in a readable storage medium. At least one processor of an intelligent analysis device may read the executable instructions from the readable storage medium. The at least one processor executes the executable instructions, so that the intelligent analysis device is enabled to implement the method for adjusting a resource of an intelligent analysis device in the foregoing method embodiments.

This application further provides a surveillance management system, including the surveillance platform shown in FIG. 8 or FIG. 9 and the intelligent analysis device shown in FIG. 10, or including the surveillance platform shown in FIG. 11 and the intelligent analysis device shown in FIG. 12.

A person of ordinary skill in the art may understand that all or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center via wired communication (for example, a coaxial cable, an optical fiber, or a digital subscriber line (DSL)) or wireless communication (for example, infrared, radio, or microwave). The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like.

What is claimed is:

1. A method for adjusting a resource of an intelligent analysis device, wherein the intelligent analysis device is a smart camera, comprising:

obtaining status information of a plurality of intelligent analysis devices that access a surveillance platform and application information deployed on the plurality of intelligent analysis devices, wherein the status information comprises resource usage and a quantity of bound common cameras of each of the plurality of intelligent analysis devices;

after a common camera, which does not have its own intelligent analysis function, accesses the surveillance platform, selecting, from the plurality of intelligent analysis devices, a first target intelligent analysis device to be bound to the common camera based on the status information of the plurality of intelligent analysis devices, the application information deployed on the plurality of intelligent analysis devices, and a distance between the common camera and each of the plurality of intelligent analysis devices; and sending, to the first target intelligent analysis device, a command for binding the common camera.

2. The method according to claim 1, wherein the selecting, from the plurality of intelligent analysis devices, a first target intelligent analysis device to be bound to the common camera based on the status information of the plurality of intelligent analysis devices, the application information deployed on the plurality of intelligent analysis devices, and a distance between the common camera and each of the plurality of intelligent analysis devices comprises:

selecting, from intelligent analysis devices whose resource usages are less than a resource usage threshold and whose application information matches the common camera, an intelligent analysis device closest to the common camera to be bound to the common camera.

3. The method according to claim 1, wherein the method further comprises:
sending a status information obtaining request to one of the plurality of intelligent analysis devices that accesses the surveillance platform; and
receiving the status information sent by the one of the plurality of intelligent analysis devices that access the surveillance platform.

4. The method according to claim 1, wherein the method further comprises:
when the resource usage of one of the plurality of intelligent analysis devices that access the surveillance platform is greater than the resource usage threshold, performing load balancing processing on the intelligent analysis device.

5. The method according to claim 4, wherein the performing load balancing processing on the intelligent analysis device comprises:
if the intelligent analysis device is bound to one or more common cameras, selecting a second target intelligent analysis device for the one or more common cameras bound to the intelligent analysis device;
sending, to the intelligent analysis device, a command for unbinding the one or more common cameras from the intelligent analysis device; and
sending, to the second target intelligent analysis device, a command for binding the one or more common cameras.

6. The method according to claim 4, wherein the performing load balancing processing on the intelligent analysis device comprises:
if the intelligent analysis device is not bound to any common camera, selecting a second target intelligent analysis device for the intelligent analysis device based on status information and application information of another intelligent analysis device that accesses the surveillance platform;
sending, to the second target intelligent analysis device, a command for binding the intelligent analysis device to one or more common cameras; and
sending, to the intelligent analysis device, a command for stopping processing a service application.

7. A method for adjusting a resource of an intelligent analysis device, wherein the intelligent analysis device is a smart camera, comprising:
after the intelligent analysis device accesses a surveillance platform, sending, to the surveillance platform, status information of the intelligent analysis device and application information deployed on the intelligent analysis device, wherein the status information comprises resource usage and a quantity of bound common cameras;
receiving, by the intelligent analysis device, a command sent by the surveillance platform for binding a common camera, wherein the common camera does not have its own intelligent analysis function and wherein the intelligent analysis device is selected to bind the common camera based on the status information and a distance between the intelligent analysis device and the common camera, and sending a video stream request to the common camera; and
receiving, by the intelligent analysis device, a video stream sent by the common camera, and analyzing and processing the received video stream.

8. The method according to claim 7, wherein the method further comprises:
receiving, by the intelligent analysis device, a status information obtaining request sent by the surveillance platform; and
sending, by the intelligent analysis device, the status information of the intelligent analysis device to the surveillance platform.

9. The method according to claim 7, wherein when the resource usage of the intelligent analysis device is greater than a resource usage threshold, the method further comprises:
receiving, by the intelligent analysis device, a command sent by the surveillance platform for unbinding one or more common cameras from the intelligent analysis device; and
sending, by the intelligent analysis device to the one or more unbound common cameras, a command for stopping sending a video stream.

10. The method according to claim 7, wherein when the resource usage of the intelligent analysis device is greater than a resource usage threshold, the method further comprises:
receiving, by the intelligent analysis device, a video stream request sent by a target intelligent analysis device bound to the intelligent analysis device, wherein the target intelligent analysis device is selected by the surveillance platform for the intelligent analysis device based on status information and application information of another intelligent analysis device that accesses the surveillance platform;
receiving, by the intelligent analysis device, a command sent by the surveillance platform for stopping processing a service application; and
sending, by the intelligent analysis device, video streams of the service application to the target intelligent analysis device.

11. A surveillance platform server, comprising:
a memory, configured to store a program instruction;
a processor, configured to invoke the program instruction in the memory to perform the method of claim 1.

12. The surveillance platform server according to claim 11, the processor is configured to perform:
selecting, from intelligent analysis devices whose resource usages are less than a resource usage threshold and whose application information matches the common camera, an intelligent analysis device closest to the common camera to be bound to the common camera.

13. The surveillance platform server according to claim 11, wherein the processor is configured to perform:
sending a status information obtaining request to one of the plurality of intelligent analysis device that access the surveillance platform; and
receiving the status information sent by one of the plurality of intelligent analysis devices that access the surveillance platform.

14. The surveillance platform server according to claim 11, wherein the processor is configured to perform:
when the resource usage of one of the plurality of intelligent analysis devices that access the surveillance platform is greater than the resource usage threshold, performing load balancing processing on the intelligent analysis device.

15. The surveillance platform server according to claim 14, wherein the processor is configured to perform:
- when the intelligent analysis device is bound to one or more common cameras, selecting a second target intelligent analysis device for the one or more common cameras bound to the intelligent analysis device;
- sending, to the intelligent analysis device, a command for unbinding the one or more common cameras from the intelligent analysis device; and
- sending, to the second target intelligent analysis device, a command for binding the one or more common cameras.

16. The surveillance platform server according to claim 14, wherein the performing load balancing processing on the intelligent analysis device comprises:
- when the intelligent analysis device is not bound to a common camera, selecting a second target intelligent analysis device for the intelligent analysis device based on status information and application information of another intelligent analysis device that accesses the surveillance platform;
- sending, to the second target intelligent analysis device, a command for binding the intelligent analysis device; and
- sending, to the intelligent analysis device, a command for stopping processing a service application.

17. An intelligent analysis device, wherein the intelligent analysis device is a smart camera, comprising:
- a connection port, configured to connect cameras;
- a processor, configured to invoke program instructions to perform:
  - sending, after the intelligent analysis device accesses a surveillance platform, to the surveillance platform, status information of the intelligent analysis device and application information deployed on the intelligent analysis device, wherein the status information comprises resource usage and a quantity of bound common cameras;
  - receiving a command sent by the surveillance platform for binding a common camera, wherein the common camera does not have its own intelligent analysis function and wherein the intelligent analysis device is selected to bind the common camera based on the status information and a distance between the intelligent analysis device and the common camera, and sending a video stream request to the common camera; and
  - receiving a video stream sent by the common camera, and analyzing and processing the received video stream.

18. The intelligent analysis device according to claim 17, wherein the processor is configured to perform:
- receiving a status information obtaining request sent by the surveillance platform; and sending the status information of the intelligent analysis device to the surveillance platform.

19. The intelligent analysis device according to claim 18, wherein the processor is configured to perform:
- receiving a command sent by the surveillance platform for unbinding one or more common cameras from the intelligent analysis device; and
- sending, by the intelligent analysis device to the one or more unbound common cameras, a command for stopping sending a video stream.

20. The intelligent analysis device according to claim 17, wherein the processor is configured to perform:
- receiving a video stream request sent by a target intelligent analysis device bound to the intelligent analysis device, wherein the target intelligent analysis device is selected by the surveillance platform for the intelligent analysis device based on status information and application information of another intelligent analysis device that accesses the surveillance platform;
- receiving a command sent by the surveillance platform for stopping processing one or more service applications; and
- sending video streams of the one or more service applications to the target intelligent analysis device.

* * * * *